Figure 19:
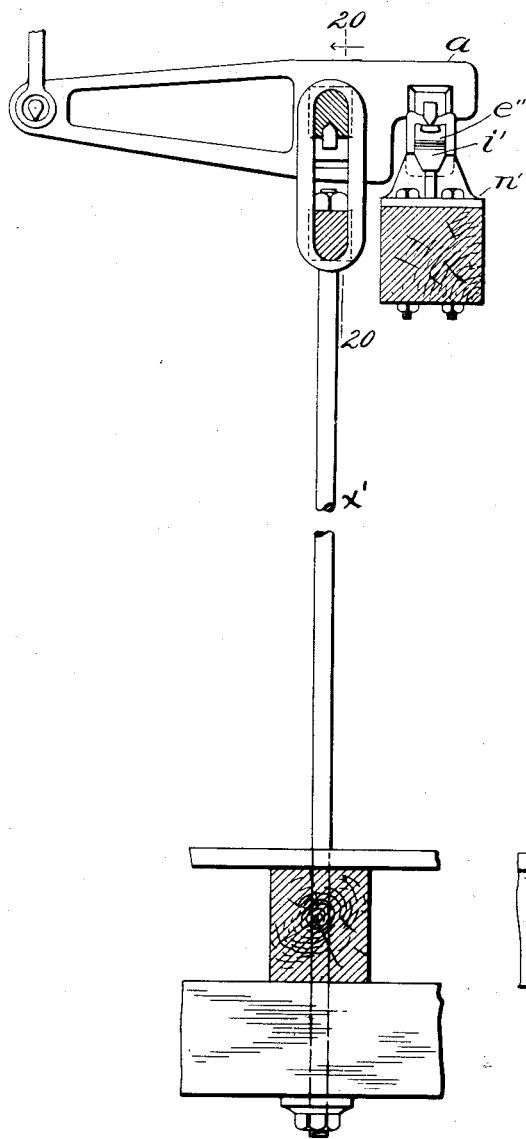

No. 832,465. PATENTED OCT. 2, 1906.
H. FAIRBANKS.
WEIGHING SCALE.
APPLICATION FILED AUG. 15, 1905.
4 SHEETS—SHEET 1.
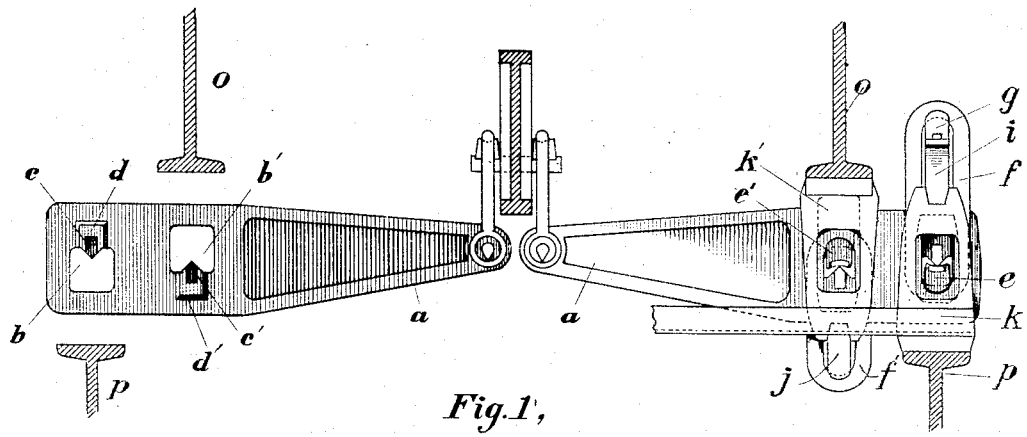
*Fig. 1.*
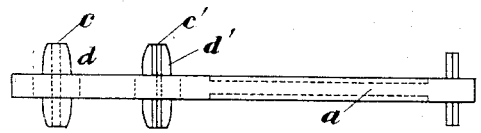
*Fig. 2.*
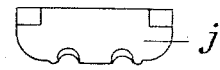
*Fig. 6.*
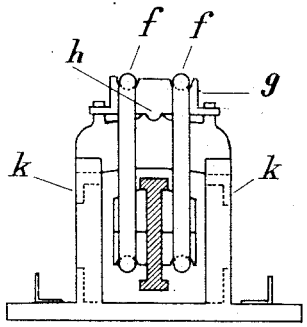
*Fig. 3.*
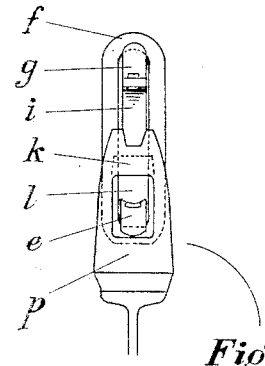
*Fig. 4.*
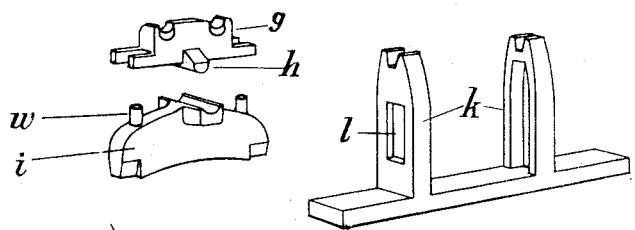
*Fig. 5.*
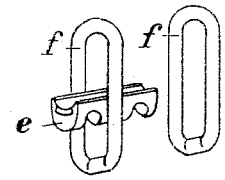
Witnesses
Albert Popkins
Wm. J. Whalley.
Inventor
Henry Fairbanks
By Sturtevant & Greeley
Attorneys No. 832,465. PATENTED OCT. 2, 1906.
H. FAIRBANKS.
WEIGHING SCALE.
APPLICATION FILED AUG. 15, 1905.
4 SHEETS—SHEET 2.
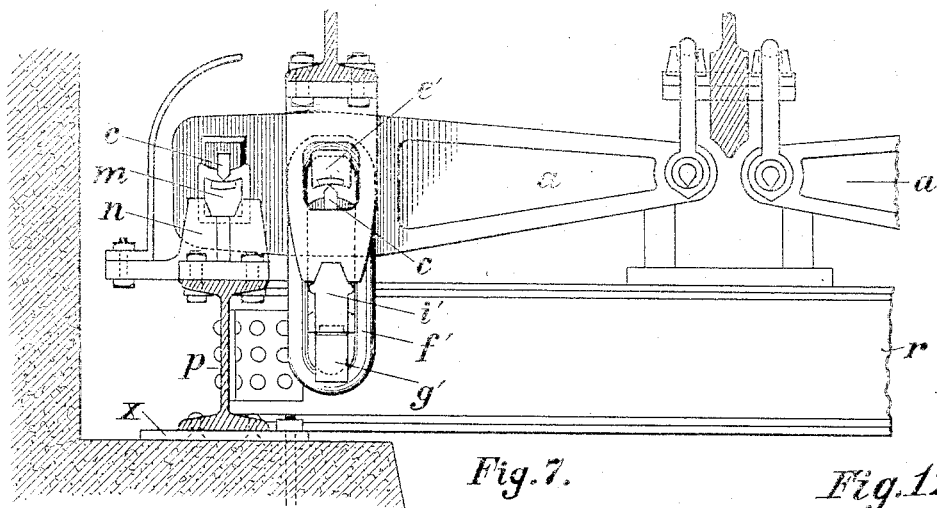
Fig. 7.
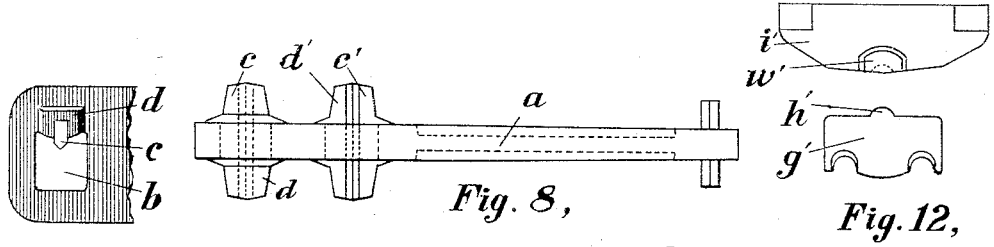
Fig. 11,  Fig. 8,
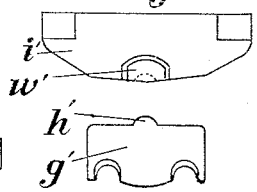
Fig. 12ª  Fig. 12,
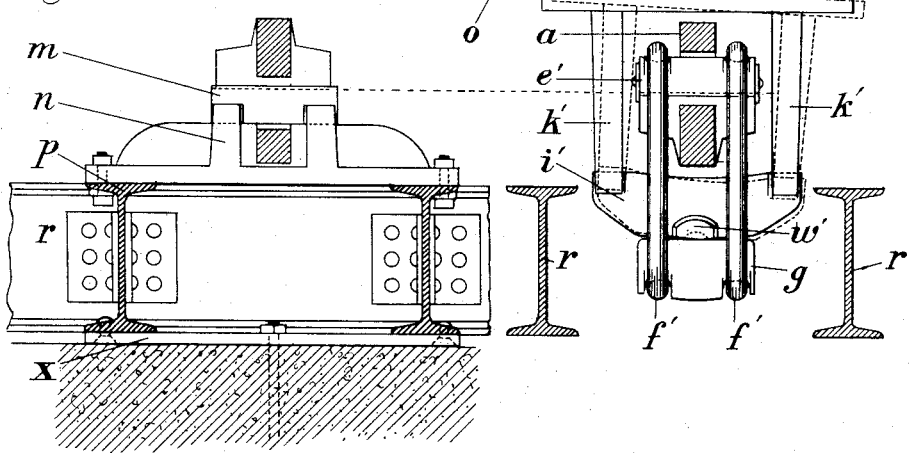
Fig. 9,  Fig. 10,
Witnesses
Albert Popkins
Wm. J. Whalley.
Inventor
Henry Fairbanks
By Sturtevant & Greeley
Attorneys No. 832,465. PATENTED OCT. 2, 1906.
H. FAIRBANKS.
WEIGHING SCALE.
APPLICATION FILED AUG. 15, 1905.
4 SHEETS—SHEET 3.
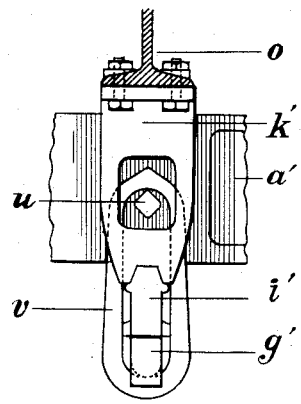
Fig. 16,
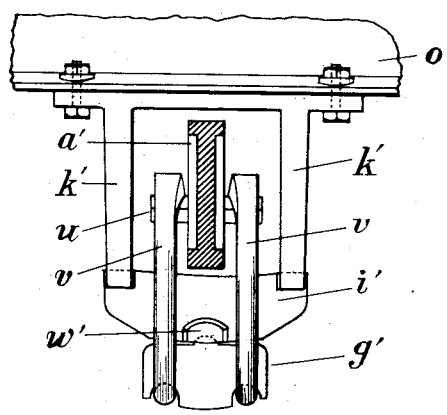
Fig. 17,
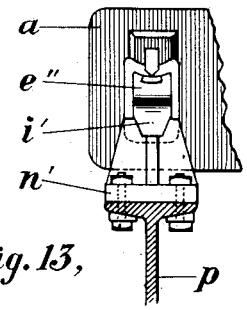
Fig. 13,
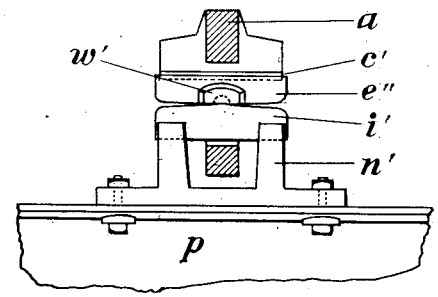
Fig. 14,
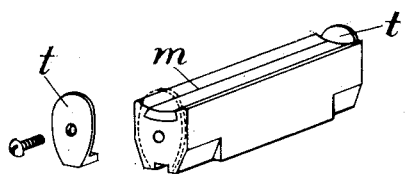
Fig. 15.
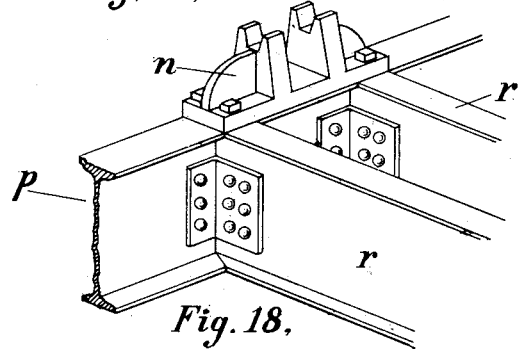
Fig. 18,
Witnesses
Albert Popkins
Wm J. Whalley
Inventor
Henry Fairbanks
By Sturtevant & Greeley
Attorneys No. 832,465. PATENTED OCT. 2, 1906.
H. FAIRBANKS.
WEIGHING SCALE.
APPLICATION FILED AUG. 15, 1905.

4 SHEETS—SHEET 4.

Witnesses
Inventor
Henry Fairbanks
By Sturtevant & Greeley
Attorneys

UNITED STATES PATENT OFFICE.

HENRY FAIRBANKS, OF ST. JOHNSBURY, VERMONT, ASSIGNOR TO E. AND T. FAIRBANKS AND COMPANY, OF ST. JOHNSBURY, VERMONT, A CORPORATION OF VERMONT.

WEIGHING-SCALE.

No. 832,465. Specification of Letters Patent. Patented Oct. 2, 1906.

Application filed August 15, 1905. Serial No. 274,295.

*To all whom it may concern:*

Be it known that I, HENRY FAIRBANKS, a citizen of the United States, residing at St. Johnsbury, in the county of Caledonia, State of Vermont, have invented certain new and useful Improvements in Weighing-Scales, of which the following is a description, reference being had to the accompanying drawings and to the letters of reference marked thereon.

This invention relates to weighing-scales, and particularly to platform-scales employed for the weighing of heavy loads, although many of its features may be employed to advantage in smaller scales of the same or of different construction.

One object of the invention is to provide a novel form of lever in which the metal is so distributed as to secure the greatest strength, the metal being disposed well above and below the neutral line of strains.

A further object of the invention is to so arrange the knife-edge pivots that they are in contact throughout their entire length with hardened bearings, and, further, to reinforce said pivots by the metal of the castings.

A still further object of the invention is to free the delicate knife-edges of the pivots and the bearings on which they rest from frictional wear, due to sliding upon each other.

A still further object of the invention is to so support one or both bearings of each lever as to permit the bearings to assume a common plane during the weighing operation and to permit free movement of the platform, due, for example, to the movement of a train to or from it without altering the relative positions of the knife-edges and their bearings.

With these and other objects in view, as will more fully hereinafter appear, the invention consists in the novel construction and arrangement of parts hereinafter described, illustrated in the accompanying drawings, and particularly pointed out in the appended claims, it being understood that various changes in the form and proportions of parts, and minor details in construction may be made without departing from the spirit or sacrificing any of the advantages of the invention.

Figure 20:
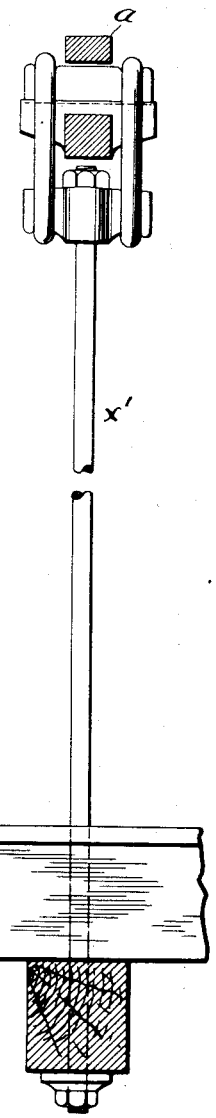

In the accompanying drawings, Figure 1 is an elevation, partly in section, of sufficient of a platform-scale to illustrate the invention. Fig. 2 is a plan view of one of the levers. Fig. 3 is an end elevation of one of the standards, the lever being shown in section. Fig. 4 is a side elevation of the standard and bearings for the butt-end of one of the levers. Fig. 5 is a detail perspective view showing the standard, cross-piece, rocking block, saddle-block bearing, and links detached. Fig. 6 is an elevation of the cross-piece of the platform-pivot. Fig. 7 is an elevation illustrating a modification of the invention, in which the fulcrum-pivot at the butt of the lever engages a fixed bearing, while the equalizing rocking block is applied to the platform-pivot. Fig. 8 is a plan view of the lever shown in Fig. 7. Fig. 9 is an elevation of the stand on which the butt-end of the lever is fulcrumed, the lever being shown in section. Fig. 10 is an end elevation, partly in section, of the platform-pivot. Fig. 11 is a detail view of the butt-end of the lever. Fig. 12 is an elevation of the rocking-block equalizer shown in Fig. 7. Fig. 12$^a$ is a similar view of the cross-piece. Fig. 13 illustrates a butt-end fulcrum embodying a further modification of the invention. Fig. 14 is an end view of the same, showing the lever in section. Fig. 15 is a detail perspective view of one form of bearing having detachable end guards. Fig. 16 shows a further modification of the invention to be used in connection with a lever having the ordinary form of knife-edge pivots. Fig. 17 is an end elevation of the same, the lever being shown in section; and Fig. 18 is a detail perspective view of a portion of the underframing, showing one of the stands. Fig. 19 is a side elevation showing the platform suspended from an elevated scale. Fig. 20 is a transverse sectional view of the same on the line 20 20 of Fig. 19.

Similar letters of reference are employed to indicate corresponding parts throughout the several figures of the drawings.

In the construction illustrated in Figs. 1 to 6, inclusive, the levers are hung by swinging links from the stands, and the platform-supports are hung by links from the levers. The evener rocking block in this case is used in supporting the fulcrum-pivot at the butt of the lever. The lever $a$ is provided with two openings $b\ b'$. The knife-edge fulcrum $c$ for the butt of the lever is arranged in the opening $b$ with its edge down, and the extended ends of this fulcrum are supported by projections $d$, extending from the opposite sides of the lever, the knife-edge crossing the plane of the lever and being supported and reinforced for its entire length. The knife-edge $c'$ of the platform-pivot extends through the opening $b$ and is similarly reinforced by the projections $d'$. The saddle-block bearing $e$ is faced with hardened steel to receive the knife-edge $b$ and its lower face is provided with recesses for the reception of the lower ends of a pair of suspension-links $f$, the upper ends of which enter recesses formed in a rocking block $g$, the central lower portion of which is provided with a rocker projection $h$, fitting in a depression in the top of a cross-piece $i$. The opposite ends of the cross-piece are fitted in recesses formed in the tops of two stands $k$, that rest on the side sills $p$ of the underframing. In order to prevent displacement of the rocker-block, the cross-piece is provided with pins or lugs $w$, which enter between pairs of lugs or fingers projecting from the ends of the rocker-block. The saddle-block extends through the opening $b$ and forms a bearing for the entire length of the knife-edge pivot $c$, thus avoiding the tendency to spring found in the usual type of bearings, where the knife-edges project from opposite sides of the lever and are supported by spaced bearings of the horseshoe type. On the knife-edge pivot $c'$ rests a saddle-block $e'$, over which pass the upper ends of links $f'$, carrying a cross-piece $j$, and this cross-piece is received in recesses formed in the lower ends of inverted stands $k$, depending from the platform-girders $o$. By the employment of the rocker-block and cross-piece the stress on the two links $f$ is equalized and the saddle-block bearing $e$ is allowed to freely swing into the same plane with the bearing $e'$. All of the stands $k$ $k'$ are provided with openings $l$ to permit inspection of the bearings when necessary and to allow the removal of the saddle-blocks, and so free the levers, which in turn can be taken out without driving out the pivots.

Figs. 7 to 12 illustrate a modification of the application of the invention in which the fulcrum-pivot at the butt of the lever engages a fixed bearing supported upon a rigid stand instead of a saddle-block bearing hanging from links, and the equalizing rocking block is applied to the cross-piece of the fulcrum-pivot. $a$ is the lever; $c$, the fulcrum-pivot engaging the bearing $m$, which, like a saddle-block, passes through the opening of the lever, but is fixed upon the rigid stand $n$, which is bolted to the side sill $p$, which in turn is supported by the base-plate $x$, set upon the masonry. $c'$ is the platform-pivot carrying the saddle-block bearing $e'$, from which hang the links $f'$ $f'$, holding the rocking-block equalizer $g'$, which supports the cross-piece $i'$ and through the standards $k'$ $k'$ the platform-girder $o$ and the load.

Figs. 13 and 14 illustrate still another modification affecting the fulcrum-bearing at the butt of the lever, which, as here shown, is adapted to serve both as a bearing and rocking-block equalizer. The lever $a$, with its knife-edge pivot $c'$, engages the steel-faced bearing-block $e''$, which on its under side has a depression fitting a projection on the top of the fixed cross-piece $i'$, so that this bearing-block serves also as a rocking block, adapted to swing freely into the same plane with the platform-bearing of the same lever. The rocker-depression of this bearing-block $e''$ does not run quite across the middle of its under surface, but is limited at the ends by the overhanging lips $w'$ $w'$, which serve to keep the bearing-block in place upon the cross-piece $i'$.

Fig. 15 shows the device which serves as an end stop, keeping the pivots in place upon their bearings. The hardened-steel pieces $t'$ $t'$, held by screws upon the ends of the bearings, meet the hardened points of the pivots with a minimum of friction.

Figs. 16 and 17 show how the advantages of the rocking block may be secured, replacing the horseshoe-shaped loop in connection with a lever having no openings, but having the pivots set in the ordinary way and standing out upon both sides, the standards, cross-piece, and rocking block being the same as already described. $a'$ is such a lever with its platform-pivot $u$ set with its edge up and on its two ends carrying two link-bearings $v$ $v$, thickened and steel-faced along the lines of contact, from which hangs the rocking block $g'$, upon which the cross-piece $i'$, the stand $k'$ $k'$, the platform-girder $o$, and the load are supported.

Fig. 18 illustrates the underframing, $p$ being one main sill on which the stand $n$ is bolted; $r$ $r$, cross-sills coped to this side sill.

The lever shown in Figs. 1 to 11 has the great advantage that its iron is disposed well above and below the neutral line of strains, so that the forces tending to compress and those tending to extend have advantage of position, while the openings at that neutral line cause no weakness and a light lever is very strong.

One of the most important objects gained is to free the delicate knife-edges of the pivots and also the bearings which they engage from any grinding wear due to sliding upon each other. This is effected by suspending the platform-supports upon the free-swinging links, which allow the motion of the platform due, for example, to moving a train upon it while the levers and bearings remain at rest. A suspended platform using a different device has been used in other types of scales, and I adapt it with my device to the scale in which the main levers hang at right angles to the track upon the platform. The supporting-stand, the cross-piece upon it, the two links swinging from that cross-piece, and the saddle-block bearing hanging by the links and engaging the fulcrum knife-edge pivot at the butt of the lever are substantially the same as the inverted stand, cross-piece, links, and saddle-block bearing engaging the platform-pivot.

The saddle-block bearing in the opening of the lever and engaging through its whole length the whole length of the knife-edge pivot has in this length of contact a great advantage over the horseshoe-shaped bearing-loop engaging the two ends of a pivot standing out on the two sides of a lever without opening. Large horseshoe-shaped loops are very difficult to make, and the length of pivot edge in contact with them is almost necessarily limited. Then under heavy strains such loops must spring with a tendency to separate the outside ends of the two bearings from the pivot edge, and the spring of the unsupported pivot increases that tendency to separate toward the ends, so that effective contact is limited to the parts close to the sides of the lever. The lever shown has the pivots supported by the casting through their whole length, and the saddle-blocks hanging from two links with bearing-surface both between and outside them have no tendency to spring, so that this device allows pivots and bearings in working contact through any desired length.

The horseshoe-shaped loop hung from a link in the middle serves to equalize the strain upon the two ends of a pivot, and so to allow the two bearings to adjust themselves in the same plane. The rocking block and links described and figured by me accomplish the same thing, taking the place of the large loop, and in many places it will work more satisfactorily. It may be applied with the cross-piece of the stand of either the fulcrum or the platform-pivot or upon a fixed bearing.

Suspending the platform is so effective in guarding the working parts of the scale from all thrusts that in many cases it may not be necessary to suspend the bearing for the fulcrum-pivot, and the simpler arrangement shown in Figs. 7 to 12 may be equally satisfactory. The bearing for that pivot in this case is fixed in the rigid stand, and the rocking-block evener is used with the inverted stand of the platform-bearing, and the butt-pivot of the lever being stationary all the other swinging connections of the lever are expected to adjust themselves to this condition.

If more convenient, the rocking-block evener may be used without links, as shown in Fig. 14. The rocking-block evener is likely to prove of advantage also in certain kinds of scales in connection with link-loop bearings, engaging the two ends of a pivot standing out from the sides of a lever, as shown in Figs. 16 and 17.

Any bearing engaging a pivot through its whole length should be fitted with end stops of hard steel, as shown in Fig. 15.

It is believed that the system of underframing shown has advantages both in solidity of construction and reduced depth of pit.

It will be understood that it is not confined to the details as shown. For example, instead of the opening in the lever for the saddle-block the lever might be cut away around where one or the other opening is shown, as indicated at $x$ in Fig. 19, but with the pivot in place supported by the casting to engage the rocking-block bearing $e$, or, again, the scale may be placed high up and the platform beneath it suspended by rods $x'$ from bearings on the platform-pivots, as shown in Figs. 19 and 20.

Having thus described my invention, what I claim as new, and desire to secure by Letters Patent, is—

1. A lever formed with its material disposed near its upper and lower edges, and having an opening through its neutral line of strains, the load-receiver pivot carried by the lever, with its knife-edge in the opening, a saddle-block bearing upon this pivot, and two swinging links hanging from the saddle-block and by which the free swinging support of the load-receiver is carried.

2. A lever or scale beam having an opening and provided with projections in alinement with one wall thereof, and a knife-edge pivot extending through said opening and reinforced by the metal of the lever, and projections.

3. In a weighing-scale, a lever having an opening, a knife-edge pivot extending through and beyond the sides of the lever and supported by the lever, a saddle-block bearing also extending through the opening and engaging the pivot for its entire length, and suspension-links encircling said saddle-block.

4. In a weighing-scale, a lever having a transverse opening, a knife-edge pivot extending therethrough and having a bearing edge of greater length than the thickness of the lever, said pivot being reinforced throughout its entire length, the opening being disposed to include the knife-edge of the pivot, and a bearing member coextensive in length with the pivot and engaging the same throughout its entire length.

5. The combination with a lever having a fulcrum knife-edge pivot with its edge down, and a platform-pivot with its edge up, of bearings for these pivots, a platform-support, a rocking block beneath the platform-support, and suspension members connecting said block with the platform-bearing.

6. The combination with a lever having a fulcrum-pivot with its edge down, and a platform-pivot with its edge up, of bearings for the pivots, a rocking block, and a pair of suspension members connecting the opposite end portions of one of the bearings to said block.

7. A lever having the bearing engaging the fulcrum knife-edge pivot supported on a rigid stand, and the bearing of the load-receiver pivot arranged parallel with said pivot and carrying two swinging links by which the free-swinging support of the load-receiver hangs.

8. A lever having knife-edge and fulcrum pivots, a stand, a bearing engaging the fulcrum knife-edge pivot and supported on said stand, and the bearing of the platform-pivot carrying swinging links encircling the pivot and bearing by which the free-swinging support of the platform hangs.

9. In a weighing-scale, a lever having a knife-edge pivot, a rocking block $e''$, steel-faced, to serve as a bearing for said knife-edge pivot, and the support $i'$ upon which it rocks, the block and pivot being coextensive in length, in combination with the other pivot of the lever, and its bearing, whereby the two bearings may swing into the same plane.

10. The combination in a weighing-scale, of a lever having a knife-edge pivot, a bearing therefor, a rocker-block connected with the two ends of the bearing, and a support having interfitting portions to permit rocking movement, and guards for limiting such movement.

11. In a weighing-scale, a rocking block $e''$, steel-faced, to serve as a bearing for one knife-edge pivot of the lever, and the support $i'$ upon which it rocks, the block and pivot extending through an opening in the lever, in combination with the other pivot of the lever, and its bearing, whereby the two bearings may swing into the same plane.

12. The combination in a weighing-scale, of a lever having a knife-edge pivot, a bearing therefor, both the pivot and bearing extending through an opening in the lever, a rocker-block, and a support having interfitting portions to permit rocking movement, and guards for limiting such movement.

13. The combination in a weighing-scale, of a lever having a knife-edge pivot, a bearing therefor, the pivot being in contact with the bearing for its entire length, a rocker-block connected with the two ends of the bearing, and a support having interfitting portions to permit rocking movement, and guards for limiting such movement.

14. In combination with a knife-edge pivot, of a lever, of a weighing-scale, a saddle-block bearing engaging the pivot, links encircling this bearing, and a supporting-stand connected by the link to the bearing, said stand having an opening in alinement with the bearing to permit removal of the latter.

15. In combination with the two main knife-edge pivots, of a lever and their bearings, a block, a projection on which it is free to rock, by which block one of these bearings is carried, whereby that bearing is allowed to swing into the same plane with the other and to equalize the stress at the two ends of each pivot.

16. The underframing shown, consisting of longitudinal sills $p$ at the sides of the scale-pit, the cross-sills $r, r$, in pairs, coped upon the side sills in place to carry the extension-lever stands at the middle of the scale, and the base-plates $x$ upon the masonry, upon which plates all the sills have their support, in combination with the fulcrum-stands $n$ bolted to the top of the side sills, and with levers carried above the level of the top of the sills.

17. In combination, the lever having laterally-projecting knife-edge pivots, the stand, a rocking block, and connecting means, including a pair of link-loops, between the pivots and the opposite ends of said rocking block.

In testimony whereof I affix my signature in presence of two witnesses.

HENRY FAIRBANKS.

Witnesses:
PERLEY F. HAGEN,
HAROLD O. FRENCH.